United States Patent

Schick et al.

[15] 3,655,561
[45] Apr. 11, 1972

[54] LUBRICANT COMPOSITIONS CONTAINING ARYL-INDANO SECONDARY AMINES

[72] Inventors: John W. Schick, Cherry Hill; Robert M. Gemmill, Jr., Woodbury, both of N.J.
[73] Assignee: Mobil Oil Corporation
[22] Filed: June 24, 1969
[21] Appl. No.: 836,168

[52] U.S. Cl. ...................252/51.5 A, 252/50, 252/390, 252/401
[51] Int. Cl. ..........................................C10m 1/34
[58] Field of Search....................252/50, 51.5 A, 390, 401; 260/576

[56] References Cited

UNITED STATES PATENTS

| | | | |
|---|---|---|---|
| 2,048,781 | 7/1936 | Craig | 252/401 X |
| 3,052,632 | 9/1962 | Loeffler | 252/50 X |
| 3,247,111 | 4/1966 | Oberright et al. | 252/50 X |
| 3,535,243 | 10/1970 | Chao et al. | 252/50 X |

Primary Examiner—Daniel E. Wyman
Assistant Examiner—W. J. Shine

Attorney—Oswald G. Hayes, Andrew L. Gaboriault, Raymond W. Barclay and Benjamin I. Kaufman

[57] ABSTRACT

Organic base compositions, subject to oxidative deterioration, are provided containing a stabilizing amount of an aryl-indano secondary amine having the structure:

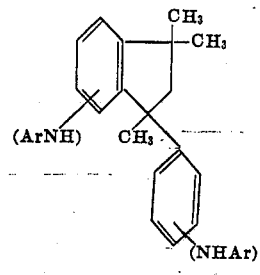

wherein Ar is phenyl, naphthyl, alkyl substituted phenyl or alkyl substituted naphthyl. The method for the preparation of these aryl-indano secondary amines is also provided.

6 Claims, No Drawings

LUBRICANT COMPOSITIONS CONTAINING ARYL-INDANO SECONDARY AMINES

BACKGROUND OF THE INVENTION

1. Field of the Invention

This invention relates to organic compositions possessing improved stabilizing properties, and, in one of its aspects, relates more particularly to organic base compositions, including natural and synthetic organic base media, possessing improved properties of oxidative and thermal stability and reduced tendency to deterioration. Still more particularly, in this aspect, the invention relates to such organic compositions as mineral oil compositions, for example lubricant oils and greases, and also such oils as automatic transmission fluids, heat-exchange fluids, hydraulic fluids, polymeric materials, for example, plastics, rubber and the like, in which the aforementioned stability against oxidative and thermal deterioration is an important requisite.

2. Description of the Prior Art compositions.

The importance of maintaining oxidative and thermal stability in organic compositions, for example, in such representative areas as hydrocarbon lubricant oils, greases and other oils in any of the other aforementioned areas, is well known. Prior to the present invention, various additives have been suggested for such purpose but have not been found to provide the desired degree of improvement. In some aspects either, or both, oxidative stability and thermal stability have not been significantly improved in the aforementioned compositions. In other instances, additives employed for such purpose have proved to be costly, far outweighing the degree of improvement obtained.

SUMMARY OF THE INVENTION

In accordance with the present invention, as more fully hereinafter described, improved organic compositions are provided which are effectively inhibited against oxidative and thermal deterioration, by incorporating therein a stabilizing amount of an aryl-indano secondary amine having the structure:

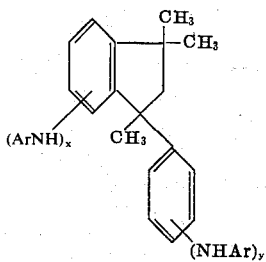

wherein Ar is phenyl, naphthyl, alkyl substituted phenyl or alkyl substituted naphthyl; wherein, when $x=1$, $y=0$; when $x=0$; $y=1$ and when $x=1$; $y=1$.

These aryl-indano secondary amines, as more fully hereinafter described, have been found to be markedly effective in stabilizing organic compositions against oxidative and thermal deterioration, and are particularly effective in providing the aforementioned stabilizing properties to mineral oil and synthetic oil compositions in the form of lubricant oils, greases and other organic media such as automatic transmission fluids, hydraulic fluids, heat-exchange fluids and the like, in which stability against oxidative and thermal deterioration must constantly be observed. As more fully hereinafter set forth, these aryl-indano secondary amines are effectively employed in small amounts which are sufficient to impart the stabilizing properties desired, in a particular composition. In general, they are usually employed in an amount of at least about 0.1% and preferably in an amount from 1 to about 10% by weight.

The organic compositions, of more specific importance, which are improved by blending with the aryl-indano secondary amines of the present invention may include mineral oils and synthetic oils of lubricating viscosities. Of particular significance is the improvement of petroleum distillate lubricating oils having boiling points as high as 650° F. or above and also mixtures of such oils. It should be noted, in this respect, that the term "distillate oils" is not intended to be restricted to straight-run distillate fractions. These distillate oils can be straight-run distillate oils, catalytically or thermally cracked (including hydrocracked) distillate oils, or mixtures of straight-run distillate oils, naphthas and the like, with cracked distillate stocks and may be of varying viscosities and pour points. Moreover, such oils can be treated in accordance with well-known commercial methods, such as acid or caustic treatment, hydrogenation, solvent-refining, clay treatment and the like.

As previously indicated, the aforementioned aryl-indano secondary amines may also be incorporated, as an anti-corrosion agent, in grease compositions. Such greases, may comprise a combination of a wide variety of lubricating vehicles and thickening or gelling agents. Thus, greases in which the aforementioned aryl-indano secondary amines are particularly effective may comprise any of the conventional hydrocarbon oils of lubricating viscosity, as the oil vehicle, and may include mineral oils or mineral oils in combination with synthetic lubricating oils, aliphatic phosphates, esters and di-esters, silicates, siloxanes and oxalkyl ethers and esters. Mineral lubricating oils, preferably employed as the lubricating vehicle, may be of any suitable lubricating viscosity range from about 45 SSU at 100° F. to about 6,000 SSU at 100° F., and, preferably, from about 50 to about 250 SSU at 210° F. These oils may have viscosity indexes varying from below 0 to about 100 or higher. Viscosity indexes from about 70 to about 95 are preferred. The average molecular weights of these oils may range from about 250 to about 800. The lubricating oil is employed in the grease composition in an amount sufficient to constitute the balance of the total grease composition, after accounting for the desired quantity of the thickening agent, and other additive components to be included in the grease formulation.

As previously indicated, the oil vehicles employed in the novel grease formulations of the present invention, in which the aforementioned aryl-indano secondary amines are incorporated as an antioxidative or anticorrosion synthetic may comprise mineral oils or combinations of mineral oils with synthetic oils of lubricating viscosity. When high temperature stability is not a requirement of the finished grease, mineral oils having a viscosity of at least 40 SSU at 100° F., and particularly those falling within the range from about 60 SSU to about 6,000 SSU at 100° F. may be employed. In instances, where synthetic vehicles are employed in addition to mineral oils, as the lubricating vehicle, various compounds of this type may be successfully utilized. Typical synthetic vehicles include: polypropylene, polypropylene glycol, trimethylol propane esters, neopentyl and pentaerythritol esters, di-(2-ethyl hexyl) sebacate, di-(2-ethyl hexyl) adipate, di-butyl phthalate, fluorocarbons, silicate esters, silanes, esters of phosphorus-containing acids, liquid ureas, ferrocene derivatives, hydrogenated mineral oils, chain-type polyphenyls, siloxanes and silicones (poly-siloxanes), alkyl-substituted diphenyl ethers typified by a butyl-substituted bis (p-phenoxy phenyl) ether, phenoxy phenyl ethers, etc.

The lubricating vehicles of the aforementioned improved greases of the present invention containing the above-described aryl-indano secondary amines as additives, are combined with a grease-forming quantity of a thickening agent. For this purpose, a wide variety of materials may be employed. These thickening or gelling agents may include any of the conventional metal salts or soaps, which are dispersed in the lubricating vehicle in grease-forming quantities, in such degree as to impart to the resulting grease composition, the desired consistency. Other thickening agents that may be employed in the grease formation may comprise the non-soap thickeners, such as surface-modified clays and silicas, aryl ureas, calcium complexes and similar materials. In general, grease thickeners may be employed which do not melt and dissolve when used at the required temperature within a particular environment; however, in all other respects, any materials which are normally employed for thickening or gelling hydrocarbon fluids for forming greases, can be used in preparing the aforementioned improved greases in accordance with the present invention.

The aryl-indano secondary amines of the present invention, as more fully hereinafter described, may be prepared, in general, by reacting a halogenated phenyl indan with a metal derivative of an aryl primary amine under conditions effective to produce the corresponding aryl-indano secondary amine. For most purposes, the reaction is carried out at a temperature from about 130° C. to about the boiling point of the aryl primary amine. Preferably, the reaction is carried out at a temperature from about 130° to about 200° C. The metal of the metal derivative of the aryl primary amine may comprise any metal, although metals of Group I of the Periodic Table are preferred.

DESCRIPTION OF SPECIFIC EMBODIMENTS

The following examples will serve to illustrate the novel aryl-indano secondary amines of the present invention, the method for their preparation and their utility in organic lubricating media.

EXAMPLE 1

Preparation of Mono-phenylamino-1,1,3-trimethyl-3-phenyl indan

To a stirred, one liter flask containing 112 grams (1.2 moles) of dry, distilled aniline and 0.4 grams of copper turnings was added 9.2 grams (0.4 mole) of metallic sodium freshly cut into small pieces. This reaction mixture was heated slowly under a nitrogen atmosphere for a total of five hours to a maximum temperature of 130° C. At this point, the sodium was completely dissolved and hydrogen evolution had ceased. Formation of phenyl sodamide was complete.

To the aforementioned phenyl sodamide product, 125 grams (0.4 mole) of monobrominated-1,1,3-trimethyl-3-phenyl indan was added at room temperature. Upon heating, a strong exothermic reaction occurred, starting at 65° C., which elevated the reaction temperature to 196° C., even with air cooling. The exotherm was of brief duration and the reaction reached completion rapidly. The reaction was allowed to continue for a total of four hours to assure completion. Isomeric phenylamino-1,1,3-trimethyl-3-phenyl indan was produced in a yield of approximately 65% according to gas chromatographic analysis. The molecular weight of the amine was found to be 319 (327 calculated) and the nitrogen content was 4.18% (4.28% calculated). The bromine content was found to be negative and the distilled product was a clear, pale yellow-brown, nearly solid, amorphous material. The phenylamino-1,1,3-trimethyl-3-phenyl indan thus produced, can be depicted as having the structure:

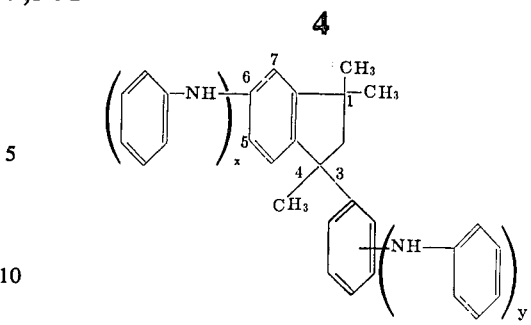

wherein, when $x=1$, $y=0$ and when $x=0$, $y=1$.

EXAMPLE 2

Preparation of Mono-(p-n-butyl)phenylamino-1,1,3-trimethyl-3-phenyl indan

To a stirred, one liter flask containing 447.0 grams (3.0 moles) of dry, distilled p-n-butyl aniline, 3.3 grams of copper powder, 2.8 grams (0.046 mole) of ethylene diamine was added 23.0 grams (1.0 mole) of metallic sodium freshly cut into small pieces. This reaction mixture was heated slowly under a nitrogen atmosphere for a total of 5.5 hours to a maximum temperature of 185° C. At this point, the sodium was completely dissolved and hydrogen evolution had ceased. Formation of the sodamide derivative was complete.

To the aforementioned p-n-butyl phenyl sodamide product, 211.0 grams (0.67 mole) of monobrominated-1,1,3-trimethyl-3-phenyl indan was added at the reaction mixture temperature of 185° C. A slight exotherm was observed which elevated the reaction temperature to 194° C. but subsided to 185° C. rapidly, the reaction reaching completion in one hour as shown by gas chromatographic analysis of the reaction mixture. Isomeric (p-n-butyl)phenylamino-1,1,3-trimethyl-3-phenyl indan was produced in a yield exceeding 90% based on conversion of the monobrominated starting material. The molecular weight of the amine was found to be 369 (383 calculated) and the nitrogen content was 3.62% (3.65% calculated). The distilled amine was a clear, yellow-brown extremely viscous fluid. The mono(p-n-butyl) phenylamino-1,1,3-trimethyl-3-phenyl indan thus produced can be depicted as having the structure:

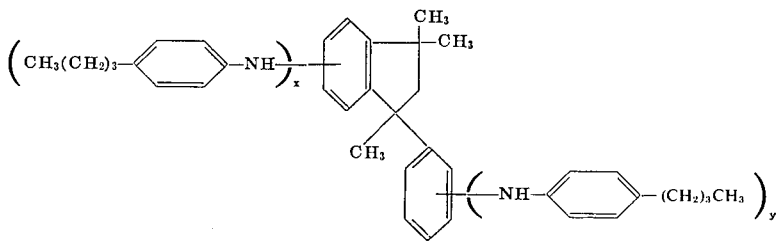

wherein, when $x=1$, $y=0$ and $x=0$, $y=1$.

EXAMPLE 3

Preparation of Di-phenylamino-1,1,3-trimethyl-3-phenyl indan

To a stirred 250 ml. flask containing 83.8 grams (0.90 mole) of dry, distilled aniline, 1.0 gram of copper powder, 5.4 grams (0.09 mole) of ethylene diamine was added 7.0 grams (0.30 mole) of metallic sodium freshly cut into small pieces. This reaction mixture was heated slowly under a nitrogen atmosphere for a total of 4.5 hours to a maximum temperature of 179° C. At this point, the sodium was completely dissolved and hydrogen evolution had ceased. Formation of the phenyl sodamide product was complete.

To the aforementioned phenyl sodamide product, 39.4 grams (0.10 mole) of dibrominated-1,1,3-trimethyl-3-phenyl indan was added to the reaction mixture temperature of 180° C. No exotherm was observed and the reaction was complete in 40 minutes as shown by gas chromatographic analysis of the reaction mixture. Isomeric Di-phenylamino-1,1,3-trimethyl-3-phenyl indan was produced in a yield approximately 100% based on conversion of the dibrominated starting material. The molecular weight of the diamine was found to be 445 (418 calculated) and the nitrogen content was 6.54% (6.70% calculated). The solid diamine product was ground to a light tan powder. The di-phenylamino-1,1,3-trimethyl-3-phenyl indan thus produced can be depicted as having the structure:

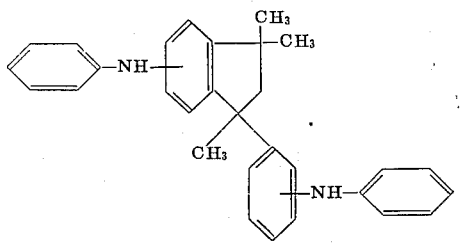

EXAMPLE 4

Preparation of Mono-α-naphthylamino-1,1,3-trimethyl-3-phenyl indan

To a stirred two liter flask containing 643.5 grams (4.5 moles) of melted alpha-naphthylamine (m.p. 50° C.), 5.0 grams of copper powder, 6.0 grams (0.10 mole) of ethylene diamine was added 34.5 (1.5 moles) of metallic sodium freshly cut into small pieces. This reaction mixture was heated slowly under a nitrogen atmosphere for a total of 1.5 hours to a maximum temperature of 198° C. At this point, the sodium had completely dissolved although no exotherm or hydrogen evolution was observed. Formation of the sodamide derivative, viz. alpha-naphthyl sodamide was considered complete.

To the aforementioned sodamide derivative, 315.0 grams (1.0 mole) of monobrominated-1,1,3-trimethyl-3-phenyl indan was added at the reaction mixture temperature of 182° C. No exotherm was observed and the reaction was complete in one hour as shown by gas chromatographic analysis of the reaction mixture. Isomeric mono-α-naphthylamino-1,1,3-trimethyl-3-phenyl indan was produced in a yield approximately 100% based on conversion of the monobrominated starting material. The molecular weight of the monoamine product was found to be 359 (377 calculated), the nitrogen content 4.03% (3.71% calculated), the carbon content 88.54% (89.12% calculated) and the hydrogen content 7.29% (7.17% calculated). The solid amine was ground to a pale yellow powder. The mono-α-naphthylamino-1,1,3-trimethyl-3-phenyl indan thus produced can be depicted as having the following structure:

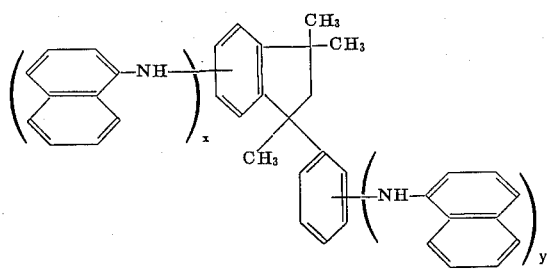

wherein, when $x=1$, $y=0$ and when $x=0$, $y=1$.

The aryl-indano secondary amines of Examples 1 through 4 were evaluated by being subjected to a catalytic oxidation test. This test determines the effectiveness of the additive in preventing oxidation of an oil sample under oxidizing conditions. The oil sample employed comprised an ester of technical grade pentaerythritol and a mixture of $C_5$ and $C_9$ monocarboxylic acids.

The test procedure is as follows: in a 200 mm. × 25 mm. test tube is placed a 25 gram sample of a test oil, having immersed therein (a) 15.6 sq. in. of sand-blasted iron wire, (b) 0.78 sq. in. of polished copper wire, and (c) 0.167 sq. in. of a polished lead specimen. The oil sample is heated to a temperature of 450° F. and maintained at this temperature while dry air is placed therethrough at the rate of 5 liters per hour for a period of 24 hours. The change in neutralization number and kinematic viscosity before and after the oxidation are recorded, and the weight loss of the lead specimen is obtained. In Table I are shown the effects of the additives of Examples 1 through 4 of the present invention, compared with the uninhibited lubricant.

TABLE I

| Antioxidant, wt. percent | Percent | Base oil | | | |
|---|---|---|---|---|---|
| | | ΔNN | ΔKV100, percent | Sludge | Pb loss, mg. |
| None | | 8.25 | 585 | Trace | 13.7 |
| Example 1 | 8 | 8.60 | 99 | Nil | 3.1 |
| | 4 | 6.40 | 99 | Nil | 8.6 |
| | 2 | 8.65 | 116 | Nil | 6.1 |
| Example 2 | 8 | 8.34 | 420 | Trace | 15.0 |
| | 4 | 6.47 | 138 | Light | 13.0 |
| | 2 | 8.03 | 171 | Trace | 6.0 |
| Example 3 | 8 | 5.84 | | Heavy | 2.0 |
| | 4 | 5.07 | 218 | Moderate | 1.0 |
| | 2 | 7.03 | 39 | Heavy | 0.4 |
| Example 4 | 8 | 4.80 | 111 | Heavy | 23.7 |
| | 4 | 4.25 | 35 | Trace | 15.8 |
| | 2 | 4.27 | 35 | Trace | 9.5 |

As will be seen from the data of the foregoing Table I, the marked efficacy of the aryl-indano secondary amines of the present invention in lubricant compositions, as anti-corrosion additives, is clearly established.

Other additives may also be included in the above-described organic compositions which can provide a variety of additional desirable characteristics such as extreme pressure agents, detergents, pour point depressants, stability improvers, and viscosity control agents.

We claim:

1. A lubricant composition containing, in an amount sufficient to impart stabilizing properties, as aryl-indano secondary amine, having the structure:

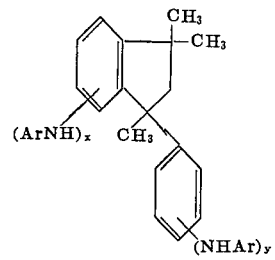

where Ar is phenyl, naphthyl, alkyl substituted phenyl or alkyl substituted naphthyl; and when $x=1$, $y=0$, when $x=0$, $y=1$, and when $x=1$, $y=1$.

2. A composition as defined in claim 1 wherein said aryl-indano secondary amine is present in an amount of at least about 0.1% by weight.

3. A composition as defined in claim 1 wherein said aryl-indano secondary amine is present in an amount from about 1 to about 10% by weight.

4. A composition as defined in claim 1 wherein said lubricant composition is selected from the group consisting of mineral oils and synthetic ester oils.

5. A composition as defined in claim 4 wherein the synthetic ester oil comprises a pentaerythritol ester.

6. A composition as defined in claim 1 wherein said composition comprises a grease.

* * * * *

UNITED STATES PATENT OFFICE
CERTIFICATE OF CORRECTION

Patent No. 3,655,561    Dated April 11, 1972

Inventor(s) JOHN W. SCHICK and ROBERT M. GEMMILL, JR.

It is certified that error appears in the above-identified patent and that said Letters Patent are hereby corrected as shown below:

Column 2, line 44 for "synthetic" read --agent--.

Column 5, line 3 for "to" read --at--.

Column 5, line 33 after 34.5 --grams-- should be inserted.

Signed and sealed this 27th day of June 1972.

(SEAL)
Attest:

EDWARD M. FLETCHER, JR.         ROBERT GOTTSCHALK
Attesting Officer               Commissioner of Patents